July 2, 1929.　　　R. D. EDWARDS　　　1,719,323
SNOWPLOW
Filed April 17, 1926　　9 Sheets-Sheet 2

Inventor
Roger D. Edwards
By his Attorneys

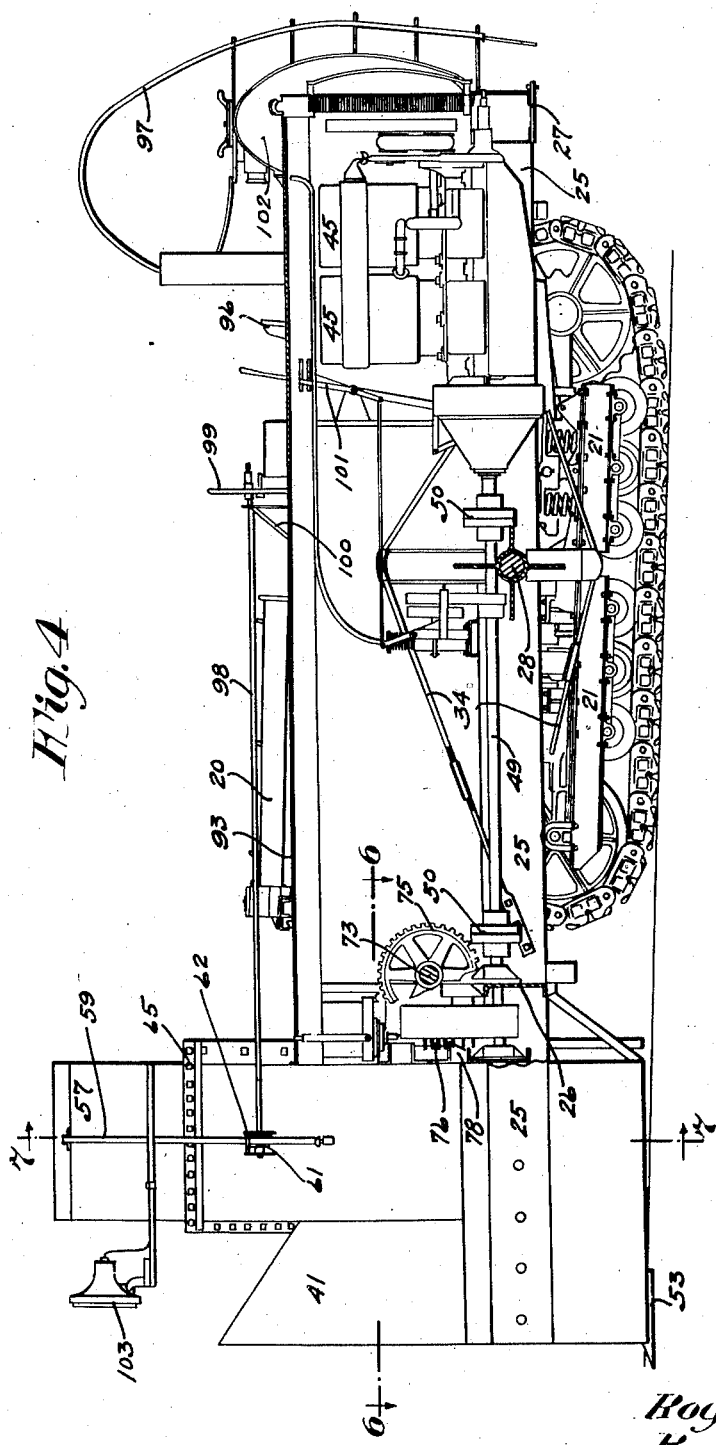

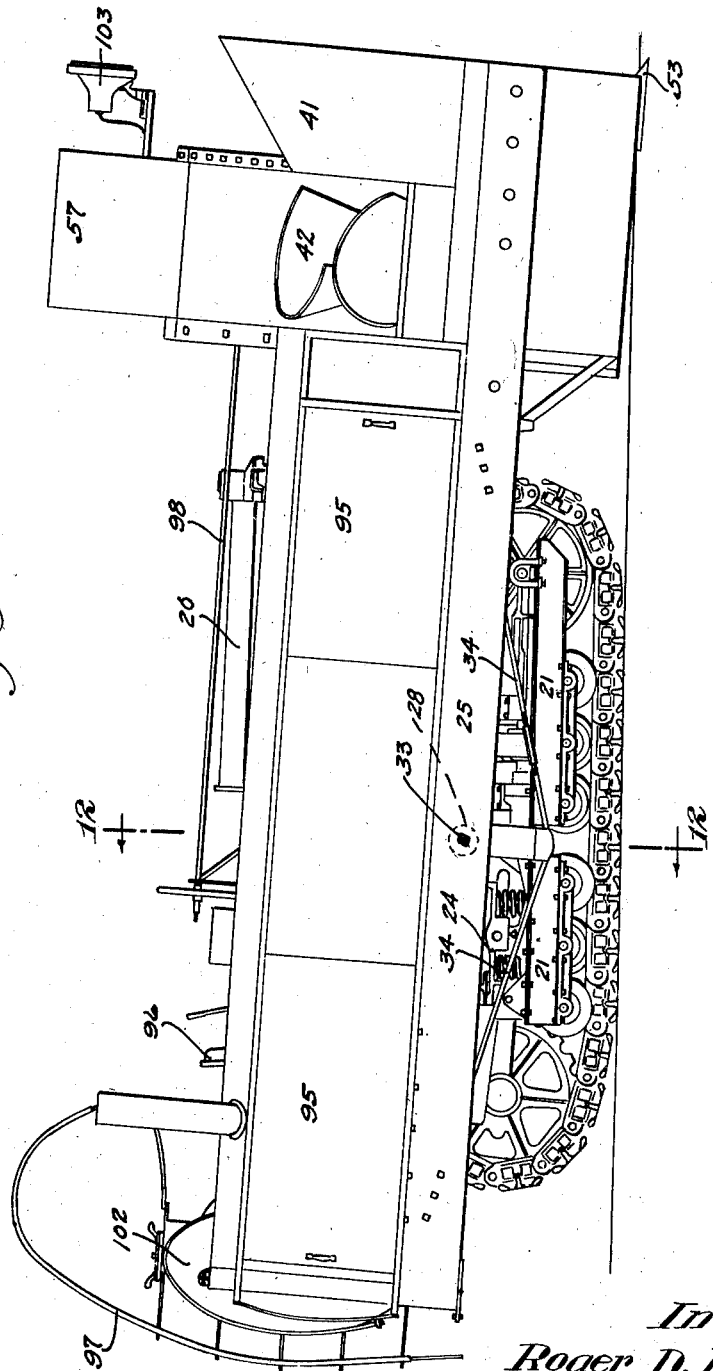

July 2, 1929.  R. D. EDWARDS  1,719,323
SNOWPLOW
Filed April 17, 1926   9 Sheets-Sheet 5
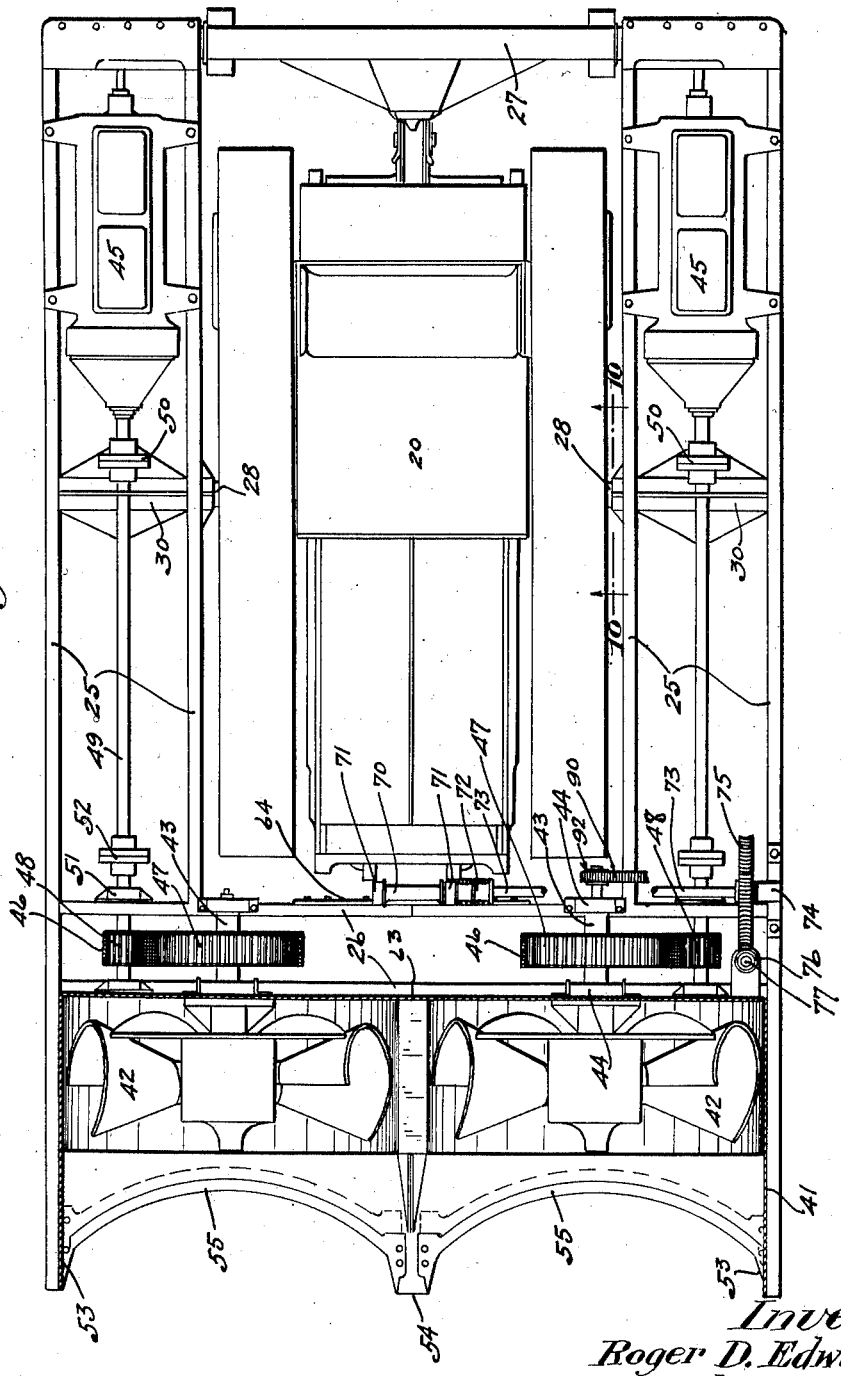
Inventor
Roger D. Edwards
By his Attorneys July 2, 1929.  R. D. EDWARDS  1,719,323
SNOWPLOW
Filed April 17, 1926   9 Sheets-Sheet 6
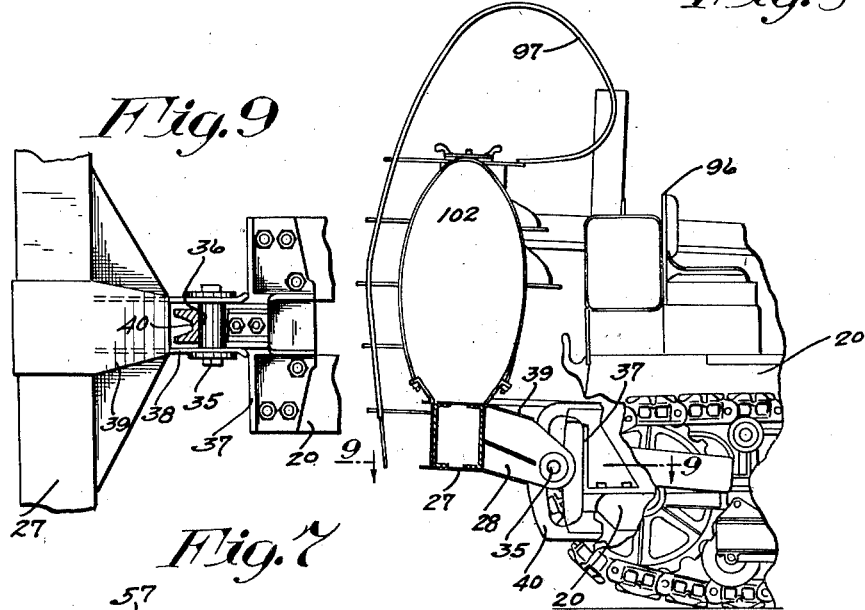
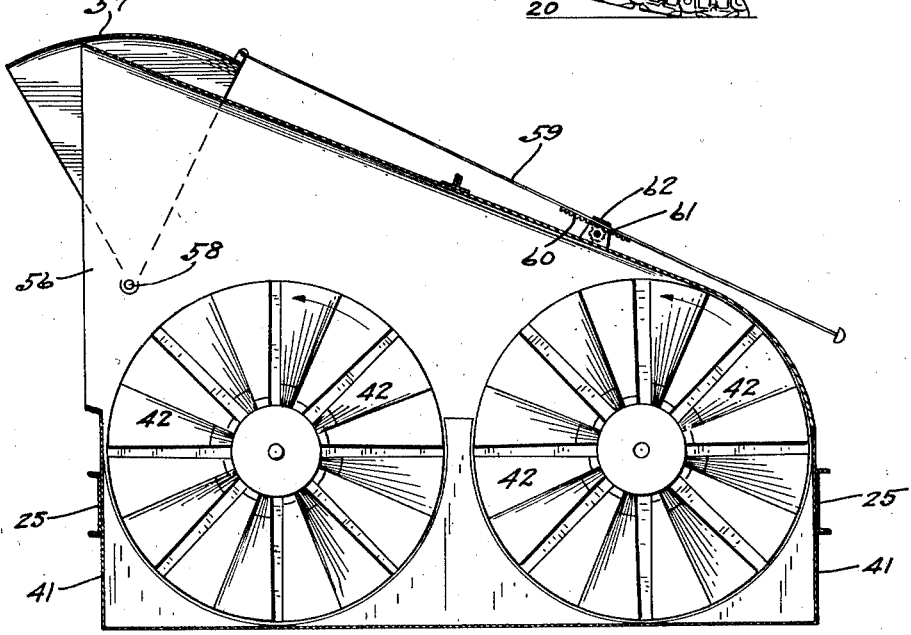
Inventor
Roger D. Edwards
By his Attorneys

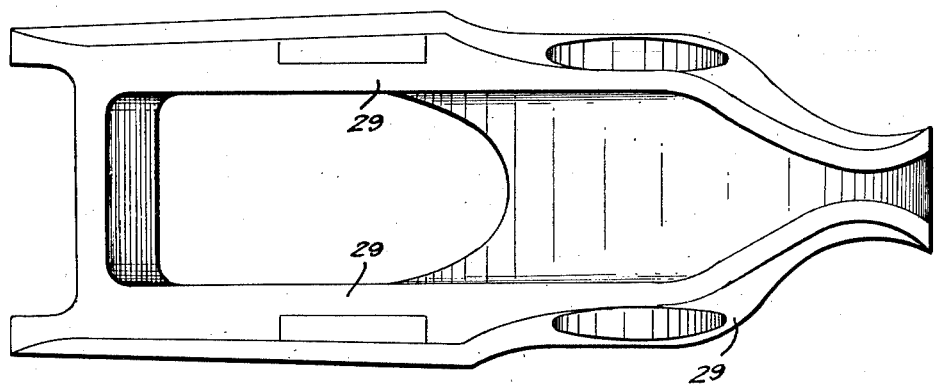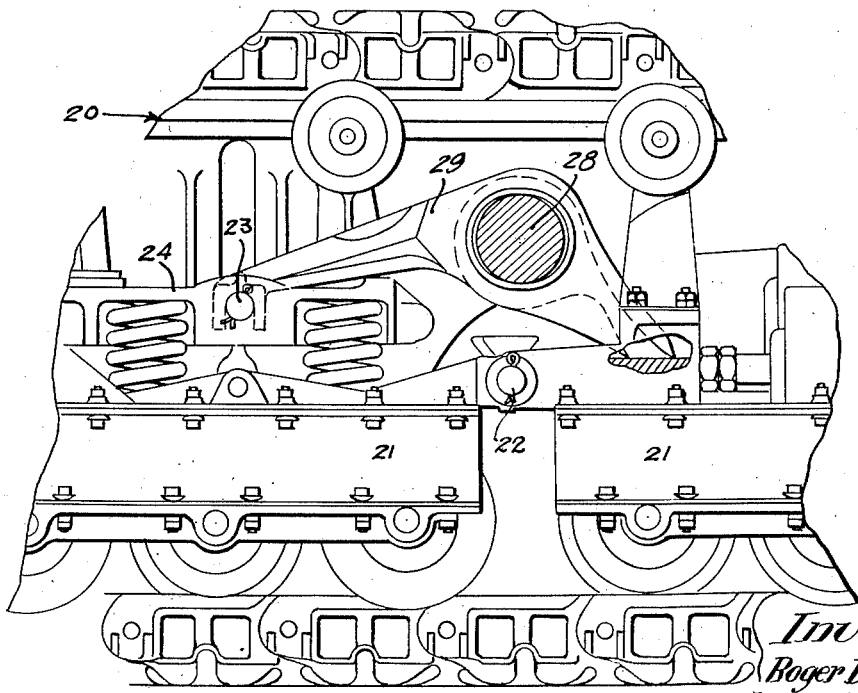

July 2, 1929.  R. D. EDWARDS  1,719,323
SNOWPLOW
Filed April 17, 1926  9 Sheets-Sheet 8
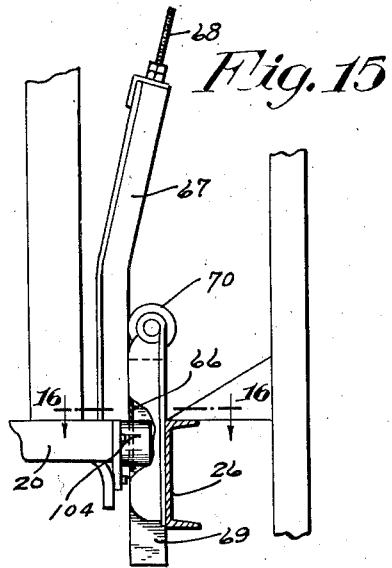
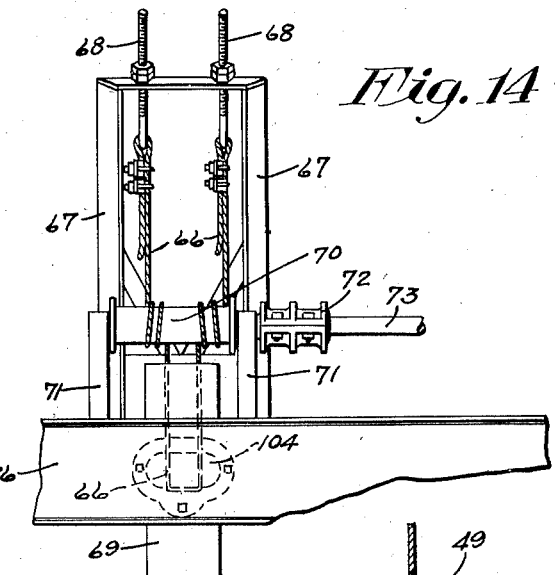
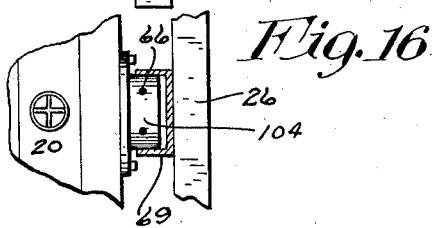
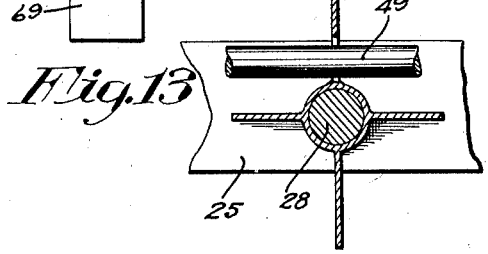
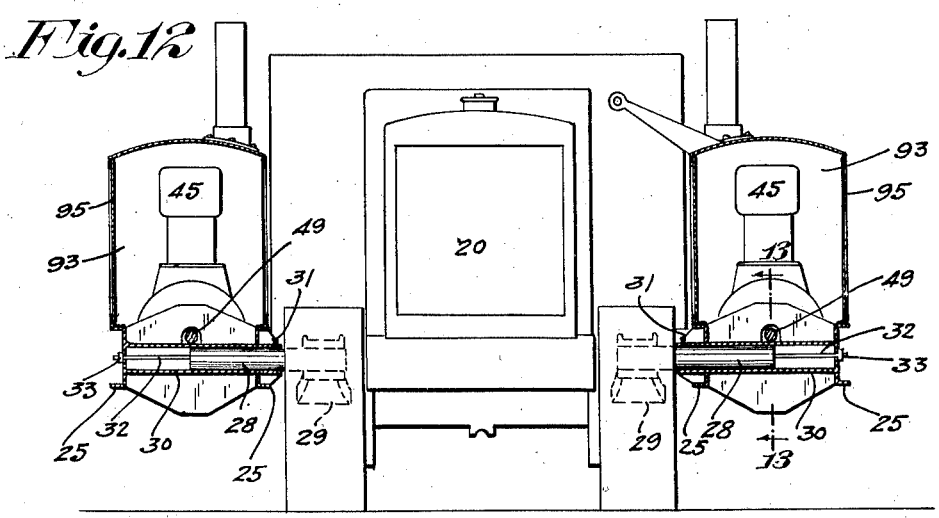
Inventor
Roger D. Edwards
By his Attorneys
Merchant and Kilson

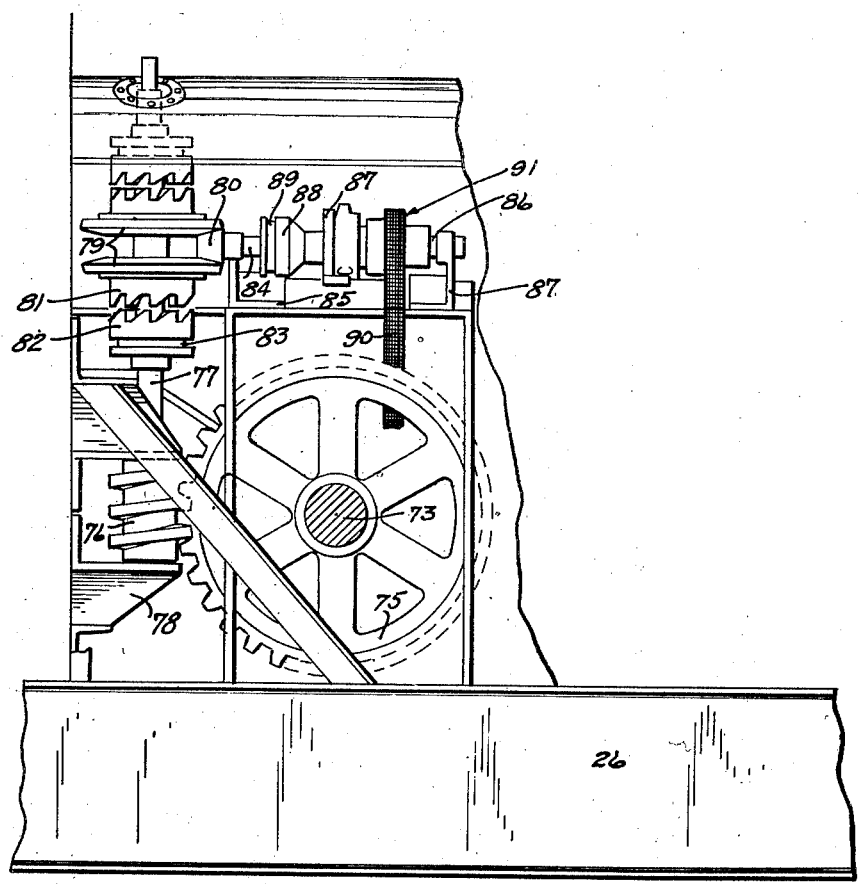

Patented July 2, 1929.

1,719,323

UNITED STATES PATENT OFFICE.

ROGER D. EDWARDS, OF ALBERT LEA, MINNESOTA.

SNOWPLOW.

Application filed April 17, 1926. Serial No. 102,687.

My invention relates to snow plows of the rotary type and has for its object to improve the same in the several particulars hereinafter noted.

In the accompanying drawings, which illustrate the invention, like characters indicate like parts throughout the several views.

Referring to the drawings:

Fig. 4 is a right side elevation with some parts shown in section;

Fig. 5 is a left side elevation;

Fig. 6 is a view partly in plan and partly in horizontal section taken on the line 6—6 of Fig. 4 and with some parts removed;

Fig. 7 is a view partly in front elevation and partly in transverse vertical section taken on the line 7—7 of Fig. 4;

Fig. 8 is a fragmentary left side elevation of the rear end portion of the snow plow and tractor;

Fig. 9 is a detail view partly in plan and partly in horizontal section taken on the line 9—9 of Fig. 8;

Fig. 10 is a fragmentary detail view with some parts sectioned on the line 10—10 of Fig. 6, on an enlarged scale;

Fig. 11 is a plan view of one of the equalizing bars;

Fig. 12 is a view partly in front elevation and partly in transverse vertical section taken on the line 12—12 of Fig. 5;

Fig. 13 is a fragmentary detail view with some parts sectioned on the line 13—13 of Fig. 12, on an enlarged scale;

Fig. 14 is a front elevation of the lifting device;

Fig. 15 is a side elevation of the same;

Fig. 16 is a fragmentary detail view with some parts sectioned on the line 16—16 of Fig. 15; and Fig. 17 is a view with some parts sectioned on the line 17—17 of Fig. 6, on an enlarged scale.

Figure 1:
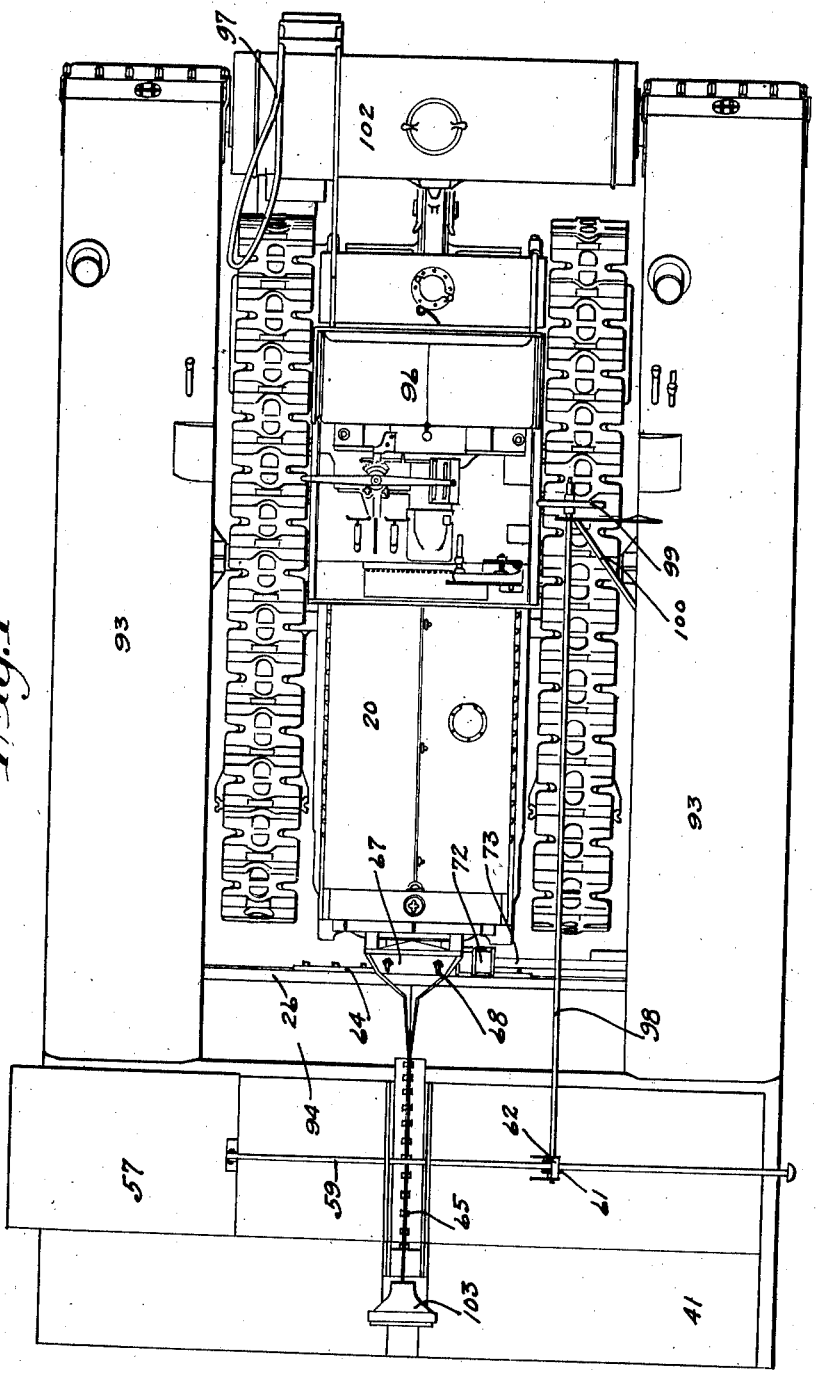
Fig. 1 is a plan view of the improved snow plow and tractor.
Figure 2:
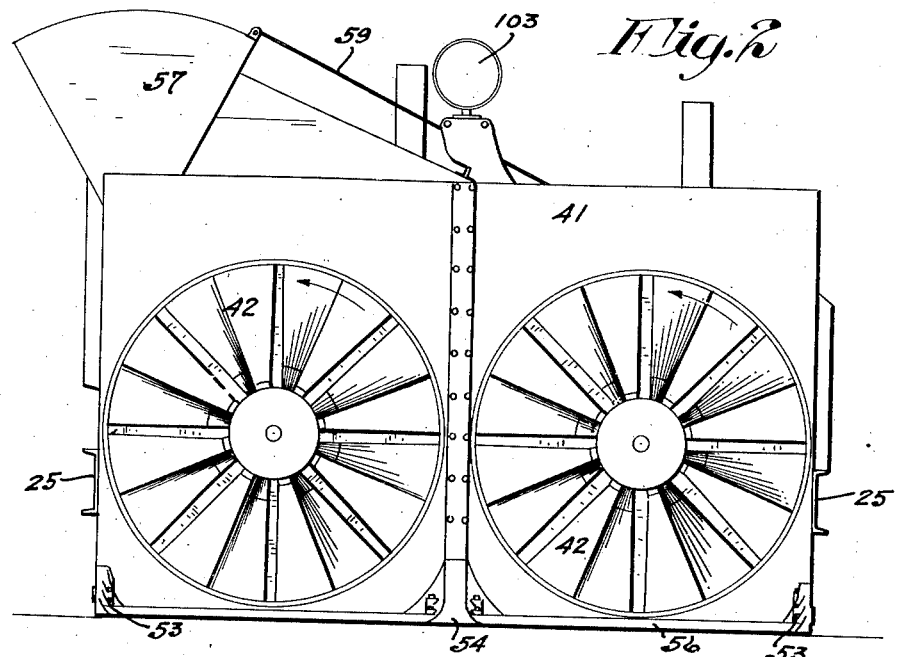
Fig. 2 is a front elevation of the snow plow.
Figure 3:
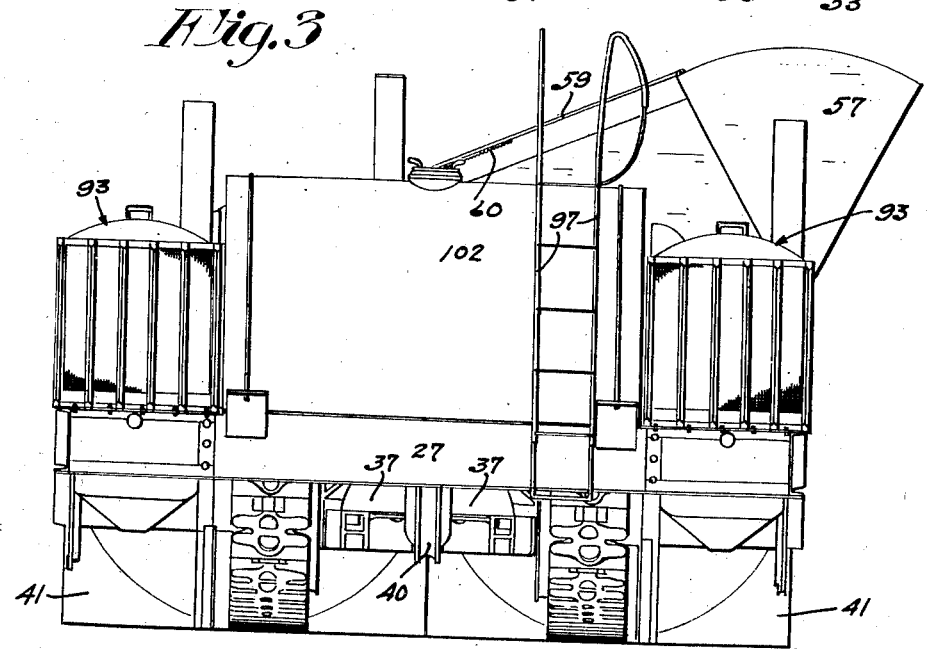
Fig. 3 is a rear elevation of the same.

The numeral 20 indicates an endless tread tractor as an entirety, with the exception of its sectional truck frames 21, hinges 22, connecting the sections of said frame, and transverse pins 23 in spring caps 24.

The invention includes a horizontal rectangular snow plow frame within which is a tractor 20, and which frame comprises longitudinal side members, each of which includes inner and outer laterally spaced channel bars 25, a front crosstie bar comprising front and rear laterally spaced channel bars 26, and a rear draw bar 27 of box-like structure made up of laterally spaced channel bars and top and bottom plates.

By reference to Fig. 6 it will be noted that the inner channel bars 25 terminate at the rear channel bar 26 and that the outer channel bars 25 project materially forward of said crosstie member.

The snow plow frame is intermediately fulcrumed to the tractor 20 for rocking movement in a vertical plane by two short axially aligned transverse shafts 28. Said shafts 28 at their inner end portions are journaled in seats in the intermediate portions of the equalizing bars 29, and their outer end portions are journaled in long sleeve bearings 30. The equalizing bars 29 extend longitudinally of the truck frames 21, span the joints between the sections thereof, and have their rear ends supported in the recessed upper faces of the rear members of the hinges 22 and their front ends have on their under sides concave seats that interlock with and rest on the pins 23 in the spring caps 24. The sleeve bearings 30 extend transversely between the channel bars 25, and set screws 31, having threaded engagement with said sleeve bearings, impinge against the shafts 28 and hold the same against endwise movement. It will be noted that the seats in the equalizing bars 29 for the shafts 28 are horizontally elongated, for a purpose that will presently appear.

By reference to Fig. 12 it will be noted that the shafts 28 at their outer ends terminate midway between the channel bars 25 and have anchored thereto axially aligned draw rods 32 that project through holes in the closed outer ends of the sleeve bearings 30 and have applied thereto nuts 33. By screwing these nuts on the draw rods 32 the shafts 28 may be pulled endwise from their seats in the equalizing bars 29 to disconnect the snow plow frame from the tractor 20. Upper and lower truss rods 34 reinforce the snow plow frame at its shaft 28.

The snow plow is drawn by the tractor 20 by means of a flexible coupling that connects the rear end of said tractor to the draw bar 27. The coupling comprises a horizontal king bolt 35 that extends through a vertically extended segmental slot 36 formed in a casting 37 rigidly bolted to the frame of the tractor 20. The radius of the slot 36 is at the axes of the shafts 28 and the king bolt 35 has its end portions mounted in a pair of laterally spaced flanges 38 on a casting 39 rigidly secured to the draw bar 27. These flanges 38 embrace the casting 37 at the slot 36 and hold the rear end of the snow plow frame against lateral movement in respect to the tractor 20.

The coupling casting 37 has a detachable yoke-like bar 40 bolted thereto, and the inner face of the transverse portion of this yoke-like bar forms the rear wall of the slot 36 and with which the king bolt 35 directly engages during the pulling of the snow plow by the tractor 20. By detaching the bar 40 from the casting 37 the coupling may be separated to release the tractor 20 from the snow plow. In case the coupling bar 40 wears out the same may be easily removed and a new one substituted therefor.

Mounted on the snow plow frame forward of the crosstie bar 26 and between the forwardly projecting front end portions of the outer channel bars 25 is a housing 41 for a pair of horizontally and radially spaced rotors or snow plow cutting wheels 42 of the type disclosed and broadly claimed in my U. S. Letters Patent No. 1,528,969 issued March 10, 1925 and entitled "Cutting wheel for snow plows".

The rotors 42 are rigidly secured to the front ends of rearwardly projecting shafts 43 journaled in front and rear bearings 44 on the channel bars 26. An internal combustion engine 45 is mounted on each side bar 25 of the snow plow frame, rearward of the fulcrum shafts 28, for independently driving one of the rotors. The rotors 42 are driven from the engines 45 by silent chains 46 that run over gears 47 on the rotor shafts 43 and pinions 48 on shafts 49 axially aligned with the crank shafts of the engines 45 and connected thereto by flexible couplings 50. The front end portions of the shafts 49 are journaled in bearings 51 on the channel bars 26, and have flexible couplings 52 rearward of said channel bars. The driving mechanism and the mounting of the rotors 42 is made the subject-matter of a copending application Serial Number 102,686 now Patent No. 1,691,232, and entitled "Mounting and driving means for snow plow cutting wheels".

Rigidly secured to the rotor housing 41, at the bottom thereof, forward of the rotors 42, are end cutting points 53 and an intermediate cutting point 54. Concave snow cutting blades 55 are detachably bolted to the cutting points 53—54. Both rotors 42 discharge the snow carried upward thereby through an opening 56 in the right side of the rotor housing 41. A deflector 57 for the snow discharged from the opening 56 in the form of a segmental housing is provided with side bars pivoted at 58 to the housing 41 and support said deflector for raising and lowering movements. An operating rod 59 for the deflector 57 is flexibly connected thereto, extends transversely over the housing 41 and is provided on its under side with a rack 60 that meshes with a pinion 61 journaled in a bearing 62 on the top of said housing, and which bearing holds the rod 59 with its rack in mesh with the pinion 61.

Referring again to the snow plow frame, the channel bars 26 thereof are transversely divided at 63 and the sections of said channels are detachably connected by plates 64 bolted thereto. The rotor housing 41 is also formed in two sections with a joint therebetween that extends longitudinally of the snow plow, and which sections are detachably connected by bolts 65.

Rigidly secured to the front end of the tractor 20 is a heavy lug 104 that extends into the channel guide 69 and holds the respective end of the snow plow against lateral movement in respect to the tractor 20.

The front end portion of the fulcrumed snow plow frame is heavier than the rear end portion thereof and is of such weight as to hold the snow plow to its work. To raise or lower the snow plow frame and thereby vertically adjust the cutting blades 55 and rotors 42 to hold the same where set there is provided a windlass cable 66. The cable 66 is folded and its looped portion secured to the tractor 20 by being passed under the lug 104, and its end portions inserted upward through holes therein. The folded cable 66 is wound on the windlass drum 70 and the ends of said cable are connected to a mast 67 on the front end of the tractor 20 by a pair of slack take-up rods 68, and its lower ends are anchored to the lug 104 of the tractor 20. The windlass drum 70 is journaled in bearings 71 on the front channel bar 26. For rotating the windlass drum in either direction the shaft thereof is connected by a coupling 72 to a transverse shaft 73 journaled in bearings 74 on the snow plow frame and provided with a worm gear 75 that meshes with a worm 76 keyed to the lower end of an upright shaft 77 journaled in bearings 78 and having a pair of connected bevel gears 79 that are loose on said shaft and in opposing relation. A bevel pinion 80 extends between the gears 79 and meshes with both thereof.

Half clutches 81 are formed with the hubs of the bevel gears 79, and co-operating half clutches 82 are formed with shipper collars 83 keyed to the shaft 77 for rotation therewith. The pinion 80 is keyed to a shaft 84 journaled in bearings 85 and axially aligned with a shaft 86 journaled in a bearing 87. A clutch 88 is provided for connecting the shaft 84 to the shaft 86 and the movable member of said clutch is provided with a shipper collar 89. The shaft 86 is driven from the shaft 43 of the left-hand rotor 42 by a silent chain 90 that runs over a gear 91 on said shaft 86 and a pinion 92 on said shaft 43. A suitable shipper lever, not shown, will be provided to successively move the half clutches 82 into mesh with the half clutches 81 and also to set the clutch 88 and release the same.

Each side member of the snow plow frame is provided with a housing 93 for the respective engine 45 and other parts mounted thereon, and a housing 94 for the front crosstie bar of said frame is provided for the parts mounted thereon. Access may be had to the interior of the housing 93 through openings in the outer sides thereof, and which openings are normally closed by sliding doors 95.

On top of the tractor 20 is a seat 96 for the operator of the tractor and snow plow. A ladder 97 is secured to the back of the snow plow frame for the operator when going to and from the seat 96. The pinion 61 is operated to open and close the deflector 57 by a rearwardly extended operating rod 98 having at its rear end a hand wheel 99 located close to the seat 96. The rear end portion of the rod 98 is supported from a bearing arm 100 on the right-hand housing 93. Engine-control and clutch levers 101 extend through longitudinally extended slots in the tops of the housings 93 within easy reach of an operator on the seat 96. A liquid fuel supply tank 102 is mounted on the draw bar 27 and a head light 103 is mounted on the front end of the rotor housing 41.

The purpose of making the seats for the shafts 28 horizontally elongated is to permit the entire pull from the tractor to the snow plow to come on the flexible coupling and not on the fulcrum for the frame.

What I claim is:

1. The combination with a tractor, of a snow plow frame intermediately fulcrumed on the tractor for vertical rocking movement, a rear draw bar on said frame, a flexible coupling connecting said draw bar to the rear portion of the tractor, a snow plow on the front end of the frame, and means for rocking the frame to raise or lower the snow plow.

2. The structure defined in claim 1 in further combination with interlocking guide members on the front of the tractor and said frame for holding the respective end of the snow plow frame against lateral movement in respect to the tractor but permitting the rocking movement of said frame.

3. The structure defined in claim 1 in which said flexible coupling comprises interlocking members for holding the respective end of the snow plow frame against lateral movement in respect to the tractor but permitting the rocking movement of said frame.

4. The combination with a tractor, of a snow plow frame intermediately fulcrumed on the tractor for vertical rocking movements, a rear draw bar on said frame, a flexible coupling connecting said draw bar to the rear portion of said tractor, a snow plow on the front end of said frame, a windlass mounted on the front portion of said frame, and a windlass cable wound on said drum and having its upper and lower ends anchored to said tractor, respectively, at points above and below said drum.

5. The structure defined in claim 1 in which said fulcrum is free for shifting movement longitudinally of the tractor to cause the entire pull from the tractor to the snow plow frame to come on the flexible coupling.

6. The combination with a tractor, of a rectilinear snow plow frame surrounding the tractor and comprising a pair of side members, a front crosstie bar, and a rear crosstie bar affording a draw bar, the side members of said frame being intermediately fulcrumed on the tractor and supporting said frame for vertical rocking movement, a flexible coupling connecting said draw bar to the rear portion of the tractor, a pair of snow cutting wheels journaled on the front end of said frame, a motor mounted on each side member of said frame, independent driving connections from the motors to the cutting wheels, and means for rocking said frame to raise or lower the snow cutting wheels.

7. The combination with a tractor of the endless tread type, of a snow plow frame, of equalizing bars, hinged truck sections, said frame being intermediately fulcrumed on the equalizing bars for vertical rocking movement, a flexible coupling connecting the rear end of the snow plow frame to the rear portion of the tractor, a snow plow on the front end of said frame, and means for rocking said frame to raise or lower said snow plow.

8. The structure defined in claim 1 in further combination with a vertical channel guide, and a stud extending into said guide, said guide and stud being slidably engageable and secured the one to the snow plow frame and the other to the tractor.

9. The structure defined in claim 1 in which said coupling comprises two castings secured, the one to said draw bar and the other to the tractor, one of said castings having a vertically extended slot and the other thereof having a pair of laterally spaced flanges between which the casting having the slot extends, and a king bolt secured to said flanges and extending through said slot.

10. The structure defined in claim 1 in which said coupling comprises two castings secured, the one to said draw bar and the other to the tractor, one of said castings having a vertically extended slot and the other thereof having a pair of laterally spaced flanges between which the casting having the slot extends, and a king bolt secured to said flanges and extending through said slot, said casting with the slot having a detachable section with which the king bolt has direct pulling engagement.

11. The structure defined in claim 6 in further combination with a housing for each frame side member.

12. The combination with a tractor, of a snow plow frame intermediately fulcrumed on the tractor for vertical rocking movement, a rear draw bar on said frame, a flexible coupling connecting said draw bar to the rear portion of the tractor, a snow plow on the front end of the frame, a mast on the front portion of the tractor, a windlass drum journaled on the snow plow frame, a cable having one of its ends attached to the mast, its other end attached to said tractor frame and its intermediate portion wound on the windlass frame, and means for operating the windlass drum.

In testimony whereof I affix my signature.

ROGER D. EDWARDS.